(12) United States Patent
Kumar et al.

(10) Patent No.: US 10,936,801 B2
(45) Date of Patent: Mar. 2, 2021

(54) AUTOMATED ELECTRONIC FORM GENERATION WITH CONTEXT CUES

(71) Applicant: International Business Machines Corporation, Armonk, NY (US)

(72) Inventors: Harshit Kumar, Delhi (IN); Arvind Agarwal, New Delhi (IN); Ajay Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 16/363,227

(22) Filed: Mar. 25, 2019

(65) Prior Publication Data
US 2020/0311192 A1 Oct. 1, 2020

(51) Int. Cl.
*G06F 40/00* (2020.01)
*G06F 40/174* (2020.01)
*G06K 9/00* (2006.01)
*G06F 9/451* (2018.01)

(52) U.S. Cl.
CPC ............ *G06F 40/174* (2020.01); *G06F 9/453* (2018.02); *G06K 9/00449* (2013.01)

(58) Field of Classification Search
CPC .... G06F 40/174; G06F 9/453; G06K 9/00449
USPC ........................................................ 715/222
See application file for complete search history.

(56) References Cited

U.S. PATENT DOCUMENTS

| | | | | |
|---|---|---|---|---|
| 5,630,025 | A * | 5/1997 | Dolby | G06N 5/022 706/46 |
| 5,966,686 | A * | 10/1999 | Heidorn | G06F 40/253 704/9 |
| 7,603,358 | B1 * | 10/2009 | Anderson | G06F 21/6218 |
| 9,213,686 | B2 | 12/2015 | Arias et al. | |
| 9,280,716 | B2 | 3/2016 | Yamaguchi | |
| 9,582,484 | B2 | 2/2017 | Gajera et al. | |
| 9,984,059 | B2 * | 5/2018 | Studer | G06F 3/0482 |
| 10,255,641 | B1 * | 4/2019 | Goldman | G06Q 40/123 |
| 10,796,231 | B2 * | 10/2020 | Wang | G06N 5/022 |
| 2004/0088285 | A1 * | 5/2004 | Martin | H04M 3/4931 |
| 2005/0114655 | A1 * | 5/2005 | Miller | H04L 63/0263 713/163 |

(Continued)

OTHER PUBLICATIONS

Lanka, Bala Subramanyam, "Rete Algorithm", May 15, 2016, 3 pages http://www.balasubramanyamlanka.com/rete-algorithm/.*

(Continued)

*Primary Examiner* — Cesar B Paula
*Assistant Examiner* — David Faber
(74) *Attorney, Agent, or Firm* — Stosch Sabo

(57) ABSTRACT

A form compliance manager configured to create a policy graph corresponding to an electronic image of an offline form and a corresponding instruction set. The form compliance manager further configured to generate an electronically fillable form corresponding to the offline form and including at least a first context cue for a first field in the electronically fillable form. The first context cue can be based on a subgraph of the policy graph associated with the first field, and the subgraph can include field completion information for the first field, field value information for the first field, and field format information for the first field. The electronically fillable form configured to present the first context cue in response to selection of the first field.

17 Claims, 11 Drawing Sheets

(56) References Cited

U.S. PATENT DOCUMENTS

| | | | | |
|---|---|---|---|---|
| 2005/0154690 | A1* | 7/2005 | Nitta | G06F 16/30 |
| | | | | 706/46 |
| 2006/0112133 | A1* | 5/2006 | Ljubicich | G06F 16/9024 |
| 2009/0070101 | A1* | 3/2009 | Masuyama | G06F 16/334 |
| | | | | 704/9 |
| 2012/0216114 | A1* | 8/2012 | Privault | G06F 3/04883 |
| | | | | 715/702 |
| 2013/0254216 | A1* | 9/2013 | Yamamoto | G06F 16/3334 |
| | | | | 707/749 |
| 2014/0195473 | A1* | 7/2014 | Citeau | G06N 5/022 |
| | | | | 706/47 |
| 2014/0281871 | A1* | 9/2014 | Brunner | G06K 9/00483 |
| | | | | 715/226 |
| 2014/0330688 | A1* | 11/2014 | DiNardo | G06Q 40/00 |
| | | | | 705/35 |
| 2015/0248391 | A1* | 9/2015 | Watanabe | G06F 16/9554 |
| | | | | 715/226 |
| 2018/0032855 | A1* | 2/2018 | Wang | G06Q 50/18 |
| 2020/0167413 | A1* | 5/2020 | Van Rotterdam | |
| | | | | G06K 9/00449 |
| 2020/0304566 | A1* | 9/2020 | Xia | G06F 9/5027 |

OTHER PUBLICATIONS

Wang et al., "CAPFF: A Context-Aware Assistant for Paper Form Filling", IEEE Transactions on Human-Machine Systems, vol. 47, No. 6, Dec. 2017, pp. 903-908.

Mell et al., "The NIST Definition of Cloud Computing", Recommendations of the National Institute of Standards and Technology, Sep. 2011, 7 pages.

\* cited by examiner

| Name | JOHN DOE |
| Address | |
| Amount Transferred | |
| ID Number | |
| Phone Number | |
| Email | |
| Date | |

Block Letters
Last name followed by first name
If there is a middle name, it has to be in block letters too

FIG. 6A

| Name | JOHN DOE |
| Address | 123 34th Ave New York USA |
| Amount Transferred | 55,000 DOLLARS |
| ID Number | |
| Phone Number | |
| Email | |
| Date | |

Use commas as Thousands Separator and hundred separator
Currency name to be followed after the amount (e.g., 100.00 DOLLARS)

FIG. 6B

| Name | JOHN DOE |
| --- | --- |
| Address | 123 34th Ave New York USA |
| Amount Transferred | 55,000 DOLLARS |
| ID Number | AAAAA1234B |
| Phone Number | |
| Email | |
| Date | |

ID Number is mandatory
FILL in BLOCK, UPPER CASE
Length is 10
First five are characters, followed by 4 numerals, and finally a character

FIG. 7A

| Name | JOHN DOE |
| --- | --- |
| Address | 123 34th Ave New York USA |
| Amount Transferred | 55,000 DOLLARS |
| ID Number | AAAAA1234B |
| Phone Number | +1 1234567899 |
| Email | |
| Date | |

10 digit number
Do not include dashes
Should start with +, followed by country code, and 10 digits
Phone number is only mandatory for amounts above 1,000 dollars.

| Name | JOHN DOE |
| Address | 123 34th Ave New York USA |
| Amount Transferred | 55,000 DOLLARS |
| ID Number | AAAAA1234B |
| Phone Number | +1 1234567899 |
| Email | John.doe@email.com |
| Date | |

In lower case
Should be in proper format
Should include @ and '.' symbol.

FIG. 8B

| Name | JOHN DOE |
| Address | 123 34th Ave New York USA |
| Amount Transferred | 55,000 DOLLARS |
| ID Number | AAAAA1234B |
| Phone Number | +1 1234567899 |
| Email | John.doe@email.com |
| Date | 09/20/2017 |

Mm/dd/yyyy format
Should not be later than today

AUTOMATED ELECTRONIC FORM GENERATION WITH CONTEXT CUES

BACKGROUND

The present disclosure relates to form compliance, and, more specifically, to automatically generating electronic forms with context cues.

Forms are widely used for acquiring and organizing information. Many forms include instructions for correctly completing the associated form. Newer forms are created electronically with embedded scripts capable of providing in-line directions. However, older paper forms that have not been digitized exhibit poor usability when completed by hand. Converting paper forms to an electronic format traditionally requires custom programming, thereby resulting in a large, expensive backlog of undigitized paper forms at many businesses, institutions, and governments.

SUMMARY

Aspects of the present disclosure are directed toward a computer-implemented method comprising creating a policy graph corresponding to an electronic image of an offline form and a corresponding instruction set. The method further includes generating an electronically fillable form corresponding to the offline form and including at least a first context cue for a first field in the electronically fillable form, where the first context cue is based on a subgraph of the policy graph associated with the first field, and where the subgraph includes field completion information for the first field, field value information for the first field, and field format information for the first field. The method further includes presenting the first context cue on the electronically fillable form in response to selection of the first field.

Further aspects of the present disclosure are directed toward systems and computer program products with functionality similar to the functionality discussed above regarding the computer-implemented method. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6A illustrates a first example of a form augmented with context cues, in accordance with embodiments of the present disclosure.

FIG. 6B illustrates a second example of a form augmented with context cues, in accordance with embodiments of the present disclosure.

FIG. 7A illustrates a third example of a form augmented with context cues, in accordance with embodiments of the present disclosure.

FIG. 7B illustrates a fourth example of a form augmented with context cues, in accordance with embodiments of the present disclosure.

FIG. 8A illustrates a fifth example of a form augmented with context cues, in accordance with embodiments of the present disclosure.

FIG. 8B illustrates a sixth example of a form augmented with context cues, in accordance with embodiments of the present disclosure.

Figure 1:
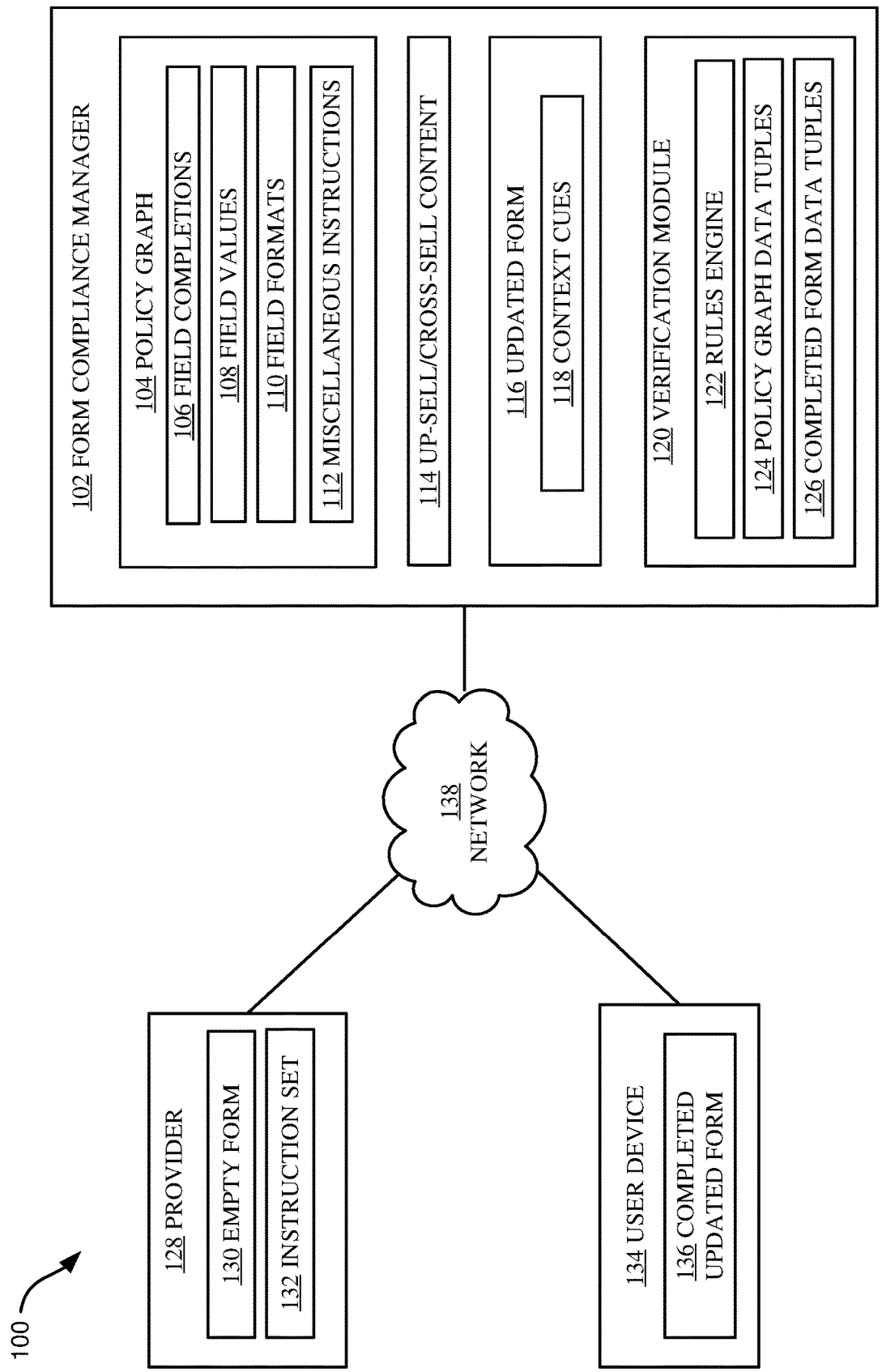
FIG. 1 illustrates a block diagram of an example computing environment, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward form compliance, and, more specifically, to automatically generating electronic forms with context cues. While not limited to such applications, embodiments of the present disclosure may be better understood in light of the aforementioned context.

Aspects of the present disclosure are directed to solving the technical problem of converting paper-based forms that are completed by hand into enriched electronic forms that can be completed using an electronic device. Further aspects of the present disclosure are directed to providing context cues (e.g., directions, instructions, guidance, hints, suggestions, examples, etc.) for selected fields while the enriched electronic form is being completed by a user. Further still, aspects of the present disclosure verify form compliance by comparing a completed, enriched electronic form with a policy graph of the form using a rules engine.

As a result, aspects of the present disclosure exhibit numerous improvements and advantages. First, aspects of the present disclosure automatically generate an electronic form with fillable fields from a paper form. This saves significant developer time and energy. Aspects of the present disclosure realize this advantage by using optical character recognition (OCR), named entity recognition (NER), and/or natural language processing (NLP) to convert a scanned image of a paper-based form into an electronic form that can be completed using an electronic device.

Second, aspects of the present disclosure improve usability of the electronic form by incorporating context cues (e.g., directions, instructions, guidance, hints, suggestions, examples, etc.) from a separate instruction set into the electronic form, thereby saving a user from referencing two documents (e.g., the form and the instruction set) while completing the form. The context cues can be statically presented (e.g., always visible near the relevant field) or dynamically presented (e.g., only visible for a given field when the given field is selected). Providing context cues improves usability during form completion by providing selected information to the user when the selected information is most relevant to the user based on the field the user is completing in the electronic form. Aspects of the present disclosure realize this advantage by developing a policy graph of the form, where the policy graph can identify, for respective fields in the form, one or more of: field completion information (e.g., mandatory, optional, conditional), field value information (e.g., minimum value, maximum value, etc.), field format information (e.g., a number of characters, a type of characters, an arrangement of characters, etc.), and/or miscellaneous instructions.

Third, aspects of the present disclosure improve form compliance by efficiently identifying deficiencies in a completed electronic form. In some embodiments, the present disclosure identifies deficiencies by comparing corresponding tuples of data, optionally using a Rete algorithm. The tuples of data can include information related to a completion indicator, a format indicator, and a value indicator.

Thus, aspects of the present disclosure are directed to techniques for automatically converting paper forms to electronic forms, thereby saving the time and costs associated with custom form conversions. Aspects of the present disclosure are also directed to techniques for automatically enriching the generated electronic form with context cues to improve usability of the electronic form. Aspects of the present disclosure are also directed to techniques for efficiently verifying form compliance of a completed form.

The advantages discussed above, and elaborated upon hereafter, are example advantages, and embodiments of the present disclosure can exist that realize all, some, or none of the advantages discussed herein while remaining within the spirit and scope of the present disclosure.

FIG. 1 illustrates a block diagram of an example computing environment 100 having a form compliance manager 102 communicatively coupled to a provider 128 and a user device 134 via a physical or wireless network 138. Form compliance manager 102 is configured to improve efficiency at both the provider 128 and improve usability at the user device 134. Form compliance manager 102 improves efficiency at the provider 128 by automatically generating updated form 116 including context cues 118 from an empty form 130 and corresponding instruction set 132. Form compliance manager 102 can further improve efficiency at the provider 128 by evaluating form compliance using verification module 120.

Form compliance manager 102 improves efficiency at the user device 134 by presenting the context cues 118 to the user device 134 while the user completes the updated form 116. Thus, the user of user device 134 receives relevant information while generating a completed updated form 136 rather than referring between an empty form 130 and searching for corresponding instructions in instruction set 132.

First, a general discussion of FIG. 1 may be helpful. Form compliance manager 102 is configured to receive an empty form 130 and corresponding instruction set 132 from provider 128, generate a policy graph 104 for the empty form 130 based on the empty form 130 and the instruction set 132, and generate an updated form 116 having context cues 118 incorporated therein. A user operating user device 134 can complete updated form 116 with the aid of context cues 118 to generate completed updated form 136. Completed updated form 136 can then be evaluated for form compliance using verification module 120 of form compliance manager 102 before being submitted back to provider 128.

Form compliance manager 102 includes a policy graph 104 generated based on the empty form 130 and corresponding instruction set 132. Policy graph 104 can contain information related to, but is not limited to, field completions 106 (e.g., mandatory field, optional field, conditionally mandatory field, conditionally optional field, etc.), field values 108 (e.g., maximum values, minimum values, ranges of values, etc.), and field formats 110 (e.g., a number of characters, a type of characters, an arrangement of characters, etc.). Field completions 106, field values 108, and field formats 110 can comprise a tuple of information in the policy graph 104 for each field identified in empty form 130. These tuples can be stored in policy graph data tuples 124 of verification module 120 for use in determining form compliance. Furthermore, these tuples of information can be used to efficiently provide context cues 118 in the updated form 116.

Field completions 106 includes mandatory fields, optional fields, and conditional fields. Mandatory fields are fields requiring input for successful form completion. Optional fields are fields that are not required to be completed for successful form completion. Conditional fields (also referred to as dependent fields) are fields that are conditionally completable such as conditionally mandatory (e.g., a field that must be completed contingent on completion of another field) or conditionally optional (e.g., a field that may be completed contingent on completion of another field). For example, answering "yes" to a certain question may trigger mandatory fields for one or more follow-up questions.

Field values 108 can refer to a range of expected values. Field values 108 can include a minimum value, a maximum value, a range of values, and/or a set of acceptable values. For example, a certain field may require an input between 0.0 and 1.0. As another example, another field may require an input between 0 and 100 (e.g., a percentage). As another example, another field may require a date input that is equal to or later than the current date. As another example, another field can require a time input that is between 8:00 AM and 5:00 PM. As another example, another field can require a zip code input, where the zip code input matches a known zip code as stored in a zip code database.

Field formats 110 can refer to a format of the input to a given field. Field formats 110 can include a number of characters, a type of characters, and/or an arrangement of characters. A number of characters can be a specific number (e.g., 10 characters), a minimum number (e.g., a password must be at least 8 characters) or a maximum number (e.g., a username must be less than 15 characters). Types of characters can include, but are not limited to, textual characters, numeric characters, alphanumeric characters, Unicode characters, ASCII characters (American Standard Code for Information Interchange), and so on. Arrangements of characters can refer to sequencing of characters (e.g., two numbers followed by four letters), separation of characters (e.g., every set of three numbers separated by a comma, two numbers-dash-four numbers, etc.), and other arrangements. For clarity, consider the following non-limiting examples: a date field can have an associated field format 110 of "YYYY/MM/DD" or "MM-DD-YYYY." As another example, an amount field can have a field format 110 of "numeric." As another example, a name field can have a field format 110 of "textual," and another field format 110 of "Last, First."

Policy graph 104 can further include miscellaneous instructions 112. Miscellaneous instructions 112 can be instructions extracted from instruction set 132 and incorporated into updated form 116 as context cues 118. Miscellaneous instructions 112 can be associated with one of field completions 106 (e.g., explaining a conditionally dependent field such as "if amount is above 'xx,' then the phone number field must be completed"), field values 108 (e.g., explaining that a date must be today's date or a later date), and/or field formats 110 (e.g., explaining that an ID number comprises eight digits followed by two letters). In some embodiments, miscellaneous instructions 112 includes instructions not directly associated with any of field completions 106, field values 108, and field formats 110 such as an instruction indicating a due date of a form.

Form compliance manager 102 also includes up-sell/cross-sell content 114. Up-sell/cross-sell content 114 can be functionalities, capabilities, advertisements, or other content that can be presented to the user device 134 via the updated form 116. Up-sell/cross-sell content 114 can be useful for monetizing aspects of the present disclosure when automatic form conversion, electronic form enrichment, and/or completed form verification are delivered as a service.

Updated form 116 can be similar to empty form 130, however, updated form 116 contains electronically fillable fields and can include context cues 118 presented on updated form 116 while it is being completed by a user. Context cues 118 can include information related to field completions 106 (e.g., mandatory, optional, etc.), field values 108 (e.g., number, text, etc.), field formats 110 (e.g., last name followed by the first name, date in YYYY-MM-DD format, etc.), miscellaneous instructions 112 (e.g., form must be submitted by 11:59 PM on Apr. 15, 2019), and/or other relevant information derived from empty form 130 and/or its corresponding instruction set 132. Updated form 116 can be in any format now known or later developed (e.g., an electronic document in Portable Document Format (PDF), a hypertext markup language (HTML) webpage, a mobile application, etc.).

Verification module 120 includes a rules engine 122 configured to review a completed updated form 136 for compliance. Rules engine 122 can check for missing values in mandatory fields, incorrect value formatting, value ambiguities, and so on. In some embodiments, rules engine 122 executes a Rete algorithm to compare policy graph data tuples 124 against completed form data tuples 126 to determine compliance or non-compliance for respective fields in completed updated form 136. Policy graph data tuples 124 can be respective data tuples for respective fields from policy graph 104 and related to field completions 106, field values 108, and field formats 110. Completed form data tuples 126 can be data tuples related to field completion, field value, and field format from the input to completed updated form 136. The rules engine 122 can identify a compliant field in response to matching a respective policy graph data tuple 124 with a corresponding completed form data tuple 126 (e.g., each data element in the tuple of data from completed updated form 136 satisfies the requirements specified in the tuple of data from updated form 116). Conversely, the rules engine 122 can identify a non-compliant field in response to failing to match a respective policy graph data tuple 124 with a corresponding completed form data tuple 126 (e.g., at least one data element in the tuple of data from completed updated form 136 fails to satisfy a requirement specified in the tuple of data from updated form 116).

Provider 128 can be a website, business, person, institution, government entity, or other entity utilizing paper-based, offline forms and desiring to convert the paper-based offline forms to electronic format. Empty form 130 can be any number of forms associated with any number of industries such as, but not limited to, an application for an account, a request to transfer assets, a report of a claim, tax forms, and so on. Instruction set 132 can be a separate sheet, booklet, webpage, file, or other data structure containing instructions for completing empty form 130. In some embodiments, instruction set 132 is integrated into empty form 130, and thus, there is only a single document containing both form fields and instructions for completing form fields rather than a distinct empty form 130 and instruction set 132.

In accordance with embodiments of the present disclosure, provider 128 can upload a scanned copy of empty form 130 and instruction set 132 and provide the scanned copy to form compliance manager 102 via the network 138.

User device 134 can be any user device such as, but not limited to, desktops, laptops, smartphones, tablets, kiosks, and so on.

FIG. 1 is illustrated for ease of discussion and is not to be taken in a limiting sense. Each embodiment of the present disclosure does not necessarily require each component discussed in FIG. 1. Likewise, embodiments of the present disclosure can exist that include more or fewer components than those components illustrated in FIG. 1. Furthermore, the configuration of the components in FIG. 1 is not limiting, and embodiments exist that include similar or dissimilar components arranged in similar or alternative configurations than the configuration shown.

Figure 2:
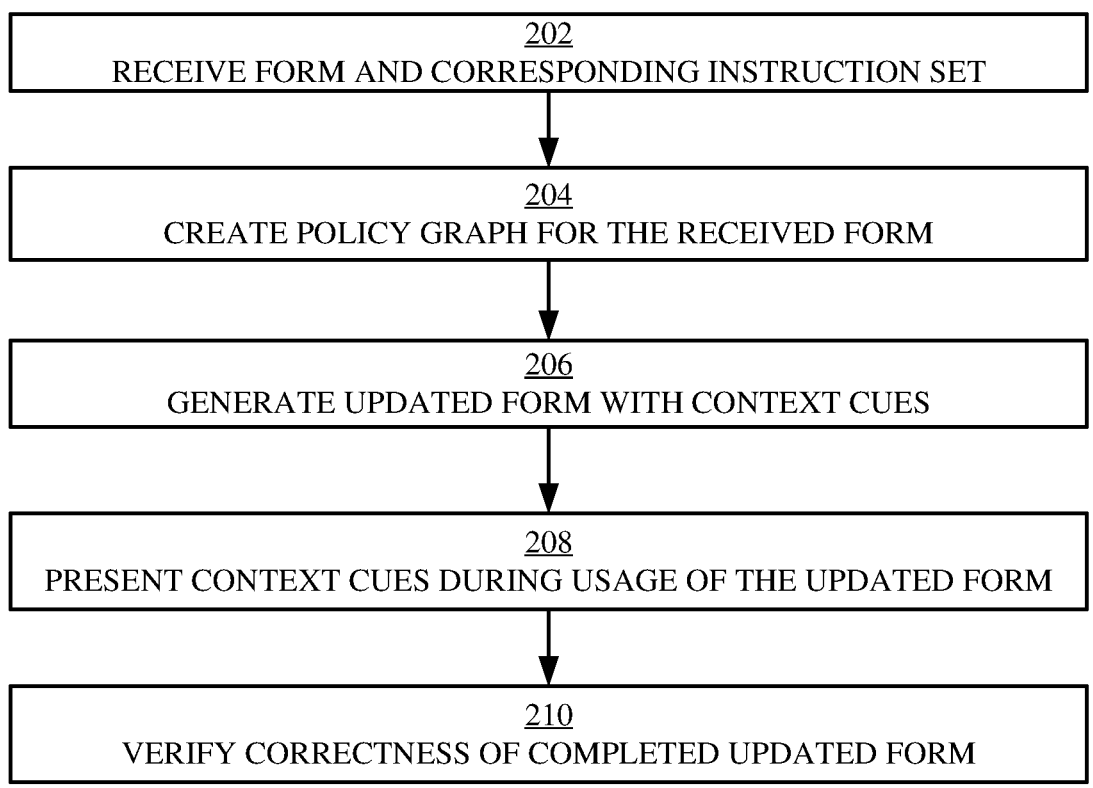
FIG. 2 illustrates a flowchart of an example method for managing form compliance, in accordance with embodiments of the present disclosure.

Referring now to FIG. 2, illustrated is a flowchart of an example method 200 for managing form compliance, in accordance with embodiments of the present disclosure. In various embodiments, the method 200 is implemented by a processor executing computer-readable program instructions, by a form compliance manager (e.g., form compliance manager 102 of FIG. 1 or 900 of FIG. 9), or by a different configuration of hardware and/or software.

Operation 202 includes receiving a form and corresponding instruction set (e.g., empty form 130 and instruction set 132 of FIG. 1). The form and corresponding instruction set can be received via a network from a remote server, a webpage, a scanner, a database, a storage device (e.g., a universal serial bus (USB), a hard disk drive (HDD), etc.), or other computer readable storage medium. The received form and corresponding instruction set can be received in a variety of formats including, but not limited to, a PDF file (e.g., .pdf), a Word document format file (e.g., .doc, .docx, etc.), a Joint Photographic Experts Group image file (e.g., .jpeg, .jpg, etc.), a bitmap image file (e.g., .bmp), a graphics interchange format (GIF) file (e.g., .gif), or a different file format. In some embodiments, the form and corresponding instructions set are received as scanned images of an offline paper-based form and corresponding instruction set.

Operation 204 includes creating a policy graph for the uploaded forms. Operation 204 can utilize Optical Character Recognition (OCR), named entity recognition (NER), natural language processing (NLP), and/or other techniques and algorithms for deriving semantic and syntactic information from the form and corresponding instruction set. In some embodiments, operation 204 includes determining field condition information (e.g., mandatory, optional, conditional, etc.), field value information (e.g., a range of appropriate values, a minimum value, a maximum value, etc.), and/or field format information (e.g., a type of characters, a number of characters, an arrangement of characters, etc.) for at least some of the fields in the form. Operation 204 is discussed in more detail hereinafter with respect to FIG. 3.

Operation 206 includes generating an updated form with context cues. The updated form can be capable of receiving user input and presenting context cues (e.g., instructions, guidance, hints, suggestions, information, etc.) inferred from the instruction set and presented on the updated form while the updated form is being completed by a user. In various embodiments, the context cues can present information related to field conditions, field values, field formats, and/or miscellaneous instructions. Operation 206 is discussed in more detail hereinafter with respect to FIG. 4.

Operation 208 includes presenting context cues on the updated form while the updated form is being completed on a user device. In some embodiments, up-sell/cross-sell content (e.g., up-sell/cross-sell content 114 of FIG. 1) is also presented on or near the updated form while the updated form is being completed on the user device.

Operation 210 includes verifying the correctness of a completed updated form. Operation 210 can include checking for missing values in mandatory fields, inappropriate values, incorrect value formatting, and so on. In some embodiments, operation 210 includes utilizing a rules engine executing a Rete algorithm to compare tuples of data derived from the policy graph against tuples of data generated from the completed updated form, where the tuples of data contain information related to field completions, field values, and field formats. Operation 210 is discussed in more detail hereinafter with respect to FIG. 5.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 3:
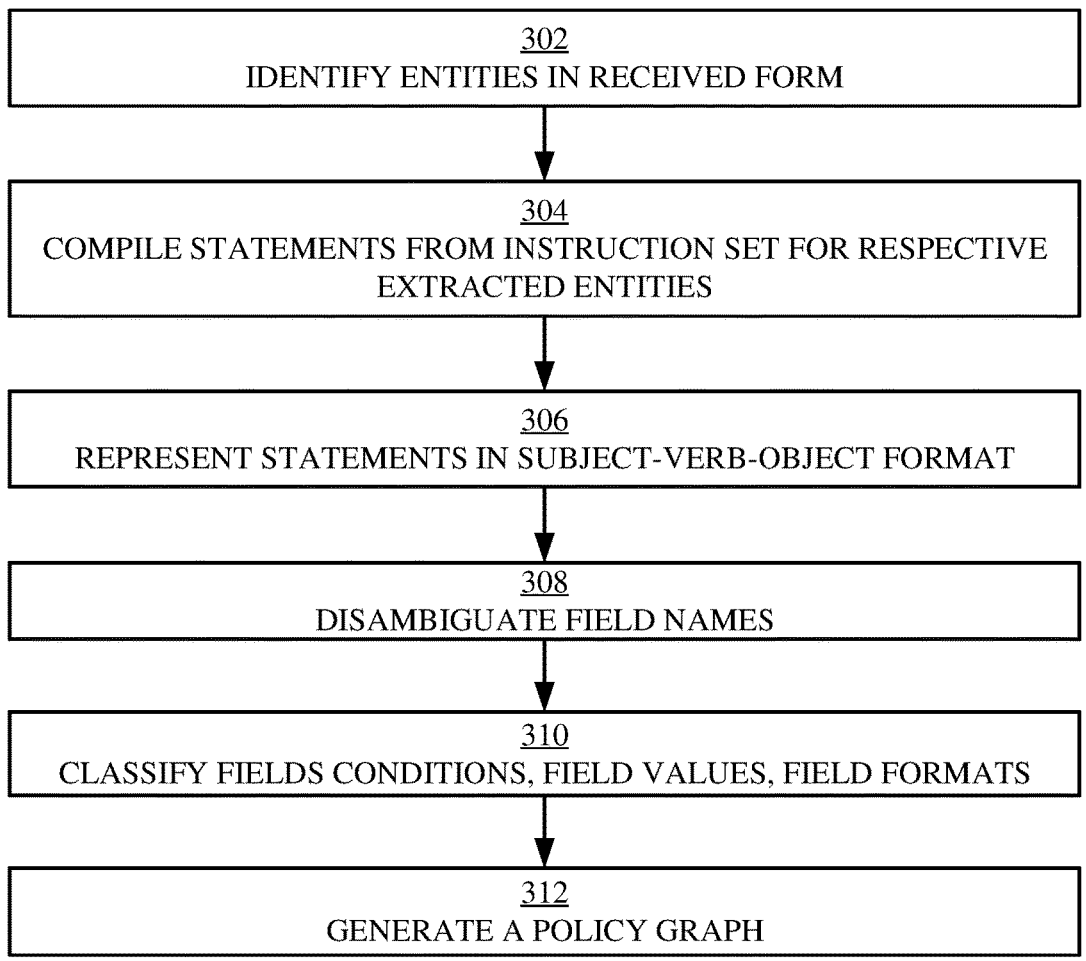
FIG. 3 illustrates a flowchart of an example method for generating a policy graph, in accordance with embodiments of the present disclosure.

Referring now to FIG. 3, illustrated is a flowchart of an example method 300 for generating a policy graph, in accordance with embodiments of the present disclosure. In various embodiments, the method 300 is implemented by a processor executing computer-readable program instructions, by a form compliance manager (e.g., form compliance manager 102 of FIG. 1 or 900 of FIG. 9), or by a different configuration of hardware and/or software.

Operation 302 includes identifying entities in the received form. Operation 302 can use named entity recognition (NER), entity identification, entity chunking, and/or entity extraction techniques to identify entities in the received form. Some example NER platforms include, but are not limited to, general architecture for text engineering (GATE), Apache OpenNLP, and SpaCy.

Operation 304 includes compiling statements from the instruction set corresponding to respective entities identified in operation 302. Operation 304 can utilize NLP to correlate extracted entities with corresponding portions of the instruction set. Operation 304 can include compiling one or more of a word, a phrase, a sentence, a paragraph, an image, a diagram, a flowchart, or a worksheet from the instruction set.

Operation 306 includes representing relevant statements from the instruction set in subject-verb-object (SVO) format. SVO format can provide a consistent, compact data structure useful for efficiently storing and consistently presenting relevant statements as context cues in the updated form.

Operation 308 includes disambiguating field names using any disambiguation techniques now known or later developed. Word-sense disambiguation (WSD) relates to correctly identifying an appropriate sense of a word as it is used in a sentence. WSD can help resolve coreference issues (e.g., two or more expressions in a text referring to a same entity) and/or ellipsis issues (e.g., missing information in a sentence fragment).

Operation 310 includes classifying fields based on field completion information (e.g., mandatory, optional, dependent, etc.), field value information (e.g., numeric input, textual input, etc.), and/or field format information (e.g., "YYYY-MM-DD," "Last Name, First Name," etc.).

Operation 312 includes generating a policy graph using the classifications of operation 310, the disambiguated field names of operation 308, and the SVO formatted instruction segments of operation 306. The policy graph can be a directed graph (e.g., a digraph, a directed network, etc.), a different type of graph, or another data structure useful for organizing policy information.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 4:
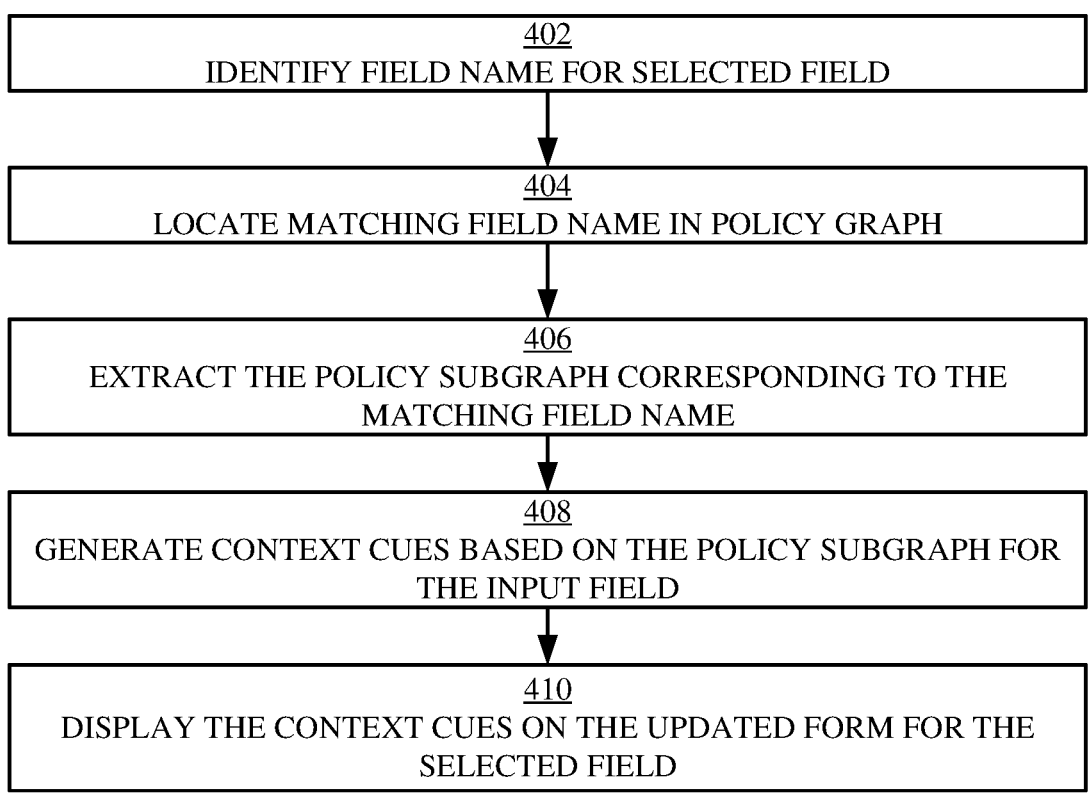
FIG. 4 illustrates a flowchart of an example method for generating context cues, in accordance with embodiments of the present disclosure.

Referring now to FIG. 4, illustrated is a flowchart of an example method 400 for generating context cues, in accordance with embodiments of the present disclosure. In various embodiments, the method 400 is implemented by a processor executing computer-readable program instructions, by a form compliance manager (e.g., form compliance manager 102 of FIG. 1 or 900 of FIG. 9), or by a different configuration of hardware and/or software.

Operation 402 includes identifying a field name of a selected field. A selected field can be a field that a user is currently entering information into or preparing to enter information into. Field selection can be indicated by, for example, one or more of the following: a user selecting a field, a user clicking on the field, a cursor placed over the field or near the field, a cursor clicking a button near the field (e.g., a help button, an instruction button, etc.), and so on.

Operation 404 includes locating a matching field name in the policy graph. Locating a matching field can be performed by matching an ID of the selected field in the updated form (e.g., field name, field serial number, etc.) to a matching ID in the policy graph. As used herein, matching can refer to identical matching (e.g., each character in each position is identical), approximate matching (e.g., a majority of characters in a majority of positions are identical), or other matching techniques.

Operation 406 includes extracting a policy subgraph corresponding to the matching field name. The policy subgraph includes information such as field completion information, field value information, field format information, miscellaneous instructions, and/or up-sell/cross-sell content.

Operation 408 includes generating context cues based on the policy subgraph and for the input field. Generating context cues can include converting one or more of the field completion information, field value information, field format information, miscellaneous instructions, and/or up-sell/cross-sell content into a consumable phrase, sentence, direction, image, graph, flowchart, worksheet, or other instructions presentable to a user. Operation 408 can use NLP or other techniques to convert the policy subgraph information into consumable content.

Operation 410 includes displaying one or more context cues generated in operation 408 on the updated form for the selected field. The one or more context cues can be displayed in any number of ways including, but not limited to, a designated portion of the updated form (e.g., a bottom left corner), an area near the selected field (e.g., beneath a field name of a selected field), inside the field (e.g., semi-transparent text in the selected field that the user automatically erases when entering input), and so on. In addition to the variety of locations the context cues can be presented, the context cues can also be presented using a variety of attention effects such as, but not limited to, font changes, font size changes, font effects (e.g., bold, strikethrough, underline, italicize), text color changes, text highlighting, text animation, and so on.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 5:
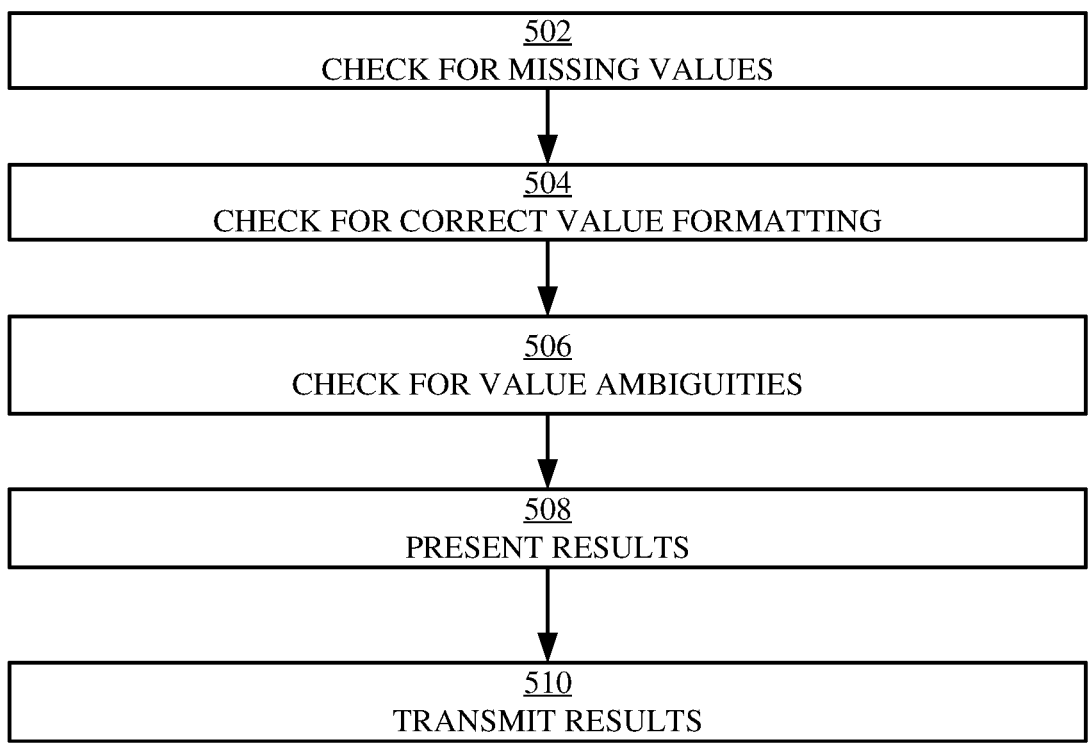
FIG. 5 illustrates a flowchart of an example method for verifying form compliance, in accordance with embodiments of the present disclosure.

Referring now to FIG. 5, illustrated is a flowchart of an example method 500 for verifying form compliance, in accordance with embodiments of the present disclosure. In various embodiments, the method 500 is implemented by a processor executing computer-readable program instructions, by a form compliance manager (e.g., form compliance manager 102 of FIG. 1 or 900 of FIG. 9), or by a different configuration of hardware and/or software.

Operation 502 includes checking for missing values. Operation 502 can include verifying that each mandatory field is completed. Operation 502 can also include verifying that each conditionally mandatory field is completed, if necessary.

Operation 504 includes checking for correct value formatting. Operation 502 can include, for each completed field, comparing the input format to a required format. Formats can include, but are not limited to, a type of characters (e.g., numeric, textual, alphanumeric), a number of characters (e.g., 10 digits), an arrangement of characters (e.g., three numbers, dash, two numbers, dash, four numbers), and so on. Thus, operation 504 can include verifying one or more of: a number of input characters matches a required number of characters, for a respective position in the sequence of input characters the input character matches a corresponding character classification, and so on.

Operation 506 includes checking for value ambiguities. Operation 506 can include verifying that each input value is within a range of acceptable values for a given field. Thus, operation 506 can include confirming an input value is greater than or equal to a minimum value, less than or equal to a maximum value, greater than or equal to a minimum value and less than or equal to a maximum value (e.g., a range), and/or matches at least one of a set of values (e.g., an address matches at least one address in a database of addresses).

Operation 508 includes presenting the results. The results can be presented to a user interface of a user device. Operation 508 can allow a user to correct deficiencies in a completed form prior to sending the form to a provider. The presented results can indicate uncompleted mandatory fields, incorrect field values, and/or incorrect field formats.

Operation 510 includes transmitting the results. The results can be transmitted to a user and/or to a provider. The results can indicate the nature of any deficiency.

The aforementioned operations can be completed in orders other than the order shown, and some operations can be completed in parallel with other operations. Additionally, embodiments exist including all, some, or none of the aforementioned operations while remaining within the spirit and scope of the present disclosure.

FIG. 6A illustrates a first example of a form presenting context cues, in accordance with embodiments of the present disclosure. As shown, when inputting text to a "Name" field, the updated form presents context cues in the bottom left of the form. Namely, the context cues indicate a field format (e.g., block letters), another field format (e.g., last name followed by first name), and a miscellaneous instruction (e.g., any middle name should be in block letters).

FIG. 6B illustrates a second example of a form presenting context cues, in accordance with embodiments of the present disclosure. As shown, when inputting text to an "Amount Transferred" field, the updated form presents context cues in the bottom left of the form. Namely, the context cues indicate a field format (e.g., use commas to separate hundreds and thousands), and a miscellaneous instruction (e.g., indicate a currency name after the number).

FIG. 7A illustrates a third example of a form presenting context cues, in accordance with embodiments of the present disclosure. As shown, when inputting text to an "ID Number" field, the updated form presents context cues in the bottom left of the form. Namely, the context cues indicate field completion information (e.g., the field is mandatory), a field format (e.g., block letters, uppercase letters), another field format (e.g., 10 digits), and another field format (e.g., five textual characters followed by four numeric characters followed by one textual character).

FIG. 7B illustrates a fourth example of a form presenting context cues, in accordance with embodiments of the present disclosure. As shown, when inputting text to a "Phone Number" field, the updated form presents context cues in the bottom left of the form. Namely, the context cues indicate a field format (e.g., a 10-digit number), another field format instruction (e.g., do not include dashes), another field format instruction (e.g., start with +, followed by country code, and 10 digits), and field completion information (e.g., conditionally mandatory for certain amounts).

FIG. 8A illustrates a fifth example of a form presenting context cues, in accordance with embodiments of the present disclosure. As shown, when inputting text to an "Email" field, the updated form presents context cues in the bottom left of the form. Namely, the context cues indicate a field format (e.g., lowercase letters), and another field format (e.g., include "@" symbol and ".").

FIG. 8B illustrates a sixth example of a form presenting context cues, in accordance with embodiments of the present disclosure. As shown, when inputting text to a "Date" field, the updated form presents context cues in the bottom left of the form. Namely, the context cues indicate a field format (e.g., mm/dd/yyyy), and a field value (e.g., the date should not be later than today's date).

FIGS. 6A-6B, 7A-7B, and 8A-8B are presented for illustrative purposes and are not to be taken in a limiting sense. For example, more or fewer context cues can be presented. The context cues can be presented in different portions of the form. The context cues can be presented using different fonts, font sizes, and font effects (e.g., highlighting, underlining, bolding, italicizing, and so on). In some embodiments, the context cues are only presented in response to data being input into a form in an incorrect format (e.g., reactive, corrective context cues).

Figure 9:
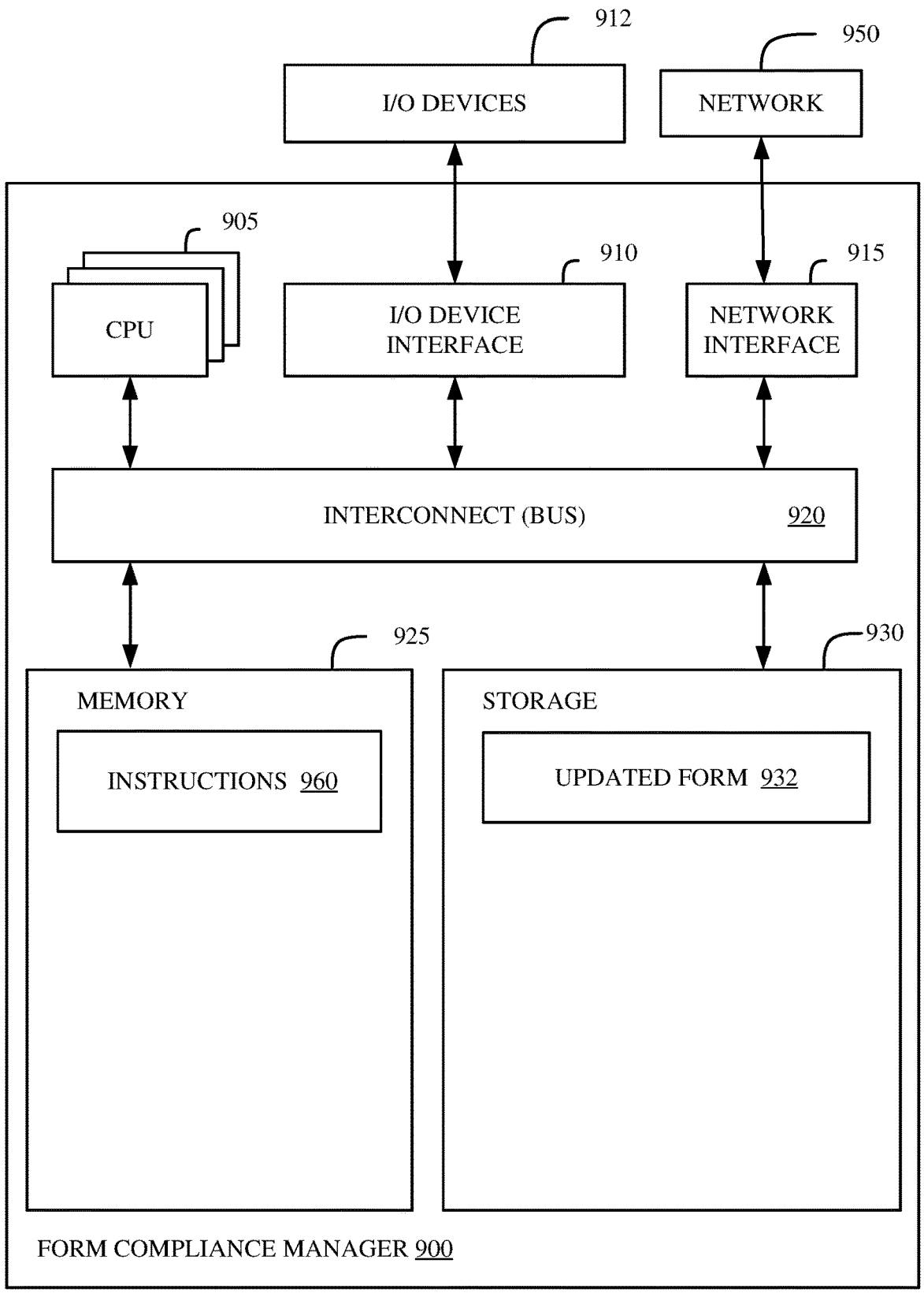
FIG. 9 illustrates a block diagram of an example form compliance manager, in accordance with embodiments of the present disclosure.

FIG. 9 illustrates a block diagram of an example form compliance manager 900 in accordance with some embodiments of the present disclosure. In various embodiments, form compliance manager 900 can perform the methods described in FIGS. 2-5 and/or the functionality discussed in FIGS. 1, 6A-6B, 7A-7B, and/or 8A-8B. In some embodiments, form compliance manager 900 provides instructions for the aforementioned methods and/or functionalities to a client machine such that the client machine executes the method, or a portion of the method, based on the instructions provided by the form compliance manager 900. In some embodiments, form compliance manager 900 comprises software executing on hardware incorporated into a plurality of devices.

The form compliance manager 900 includes a memory 925, storage 930, an interconnect (e.g., BUS) 920, one or more CPUs 905 (also referred to as processors 905 herein), an I/O device interface 910, I/O devices 912, and a network interface 915.

Each CPU 905 retrieves and executes programming instructions stored in the memory 925 or storage 930. The interconnect 920 is used to move data, such as programming instructions, between the CPUs 905, I/O device interface 910, storage 930, network interface 915, and memory 925. The interconnect 920 can be implemented using one or more busses. The CPUs 905 can be a single CPU, multiple CPUs, or a single CPU having multiple processing cores in various embodiments. In some embodiments, a CPU 905 can be a digital signal processor (DSP). In some embodiments, CPU 905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 925 is generally included to be representative of a random access memory (e.g., static random access memory (SRAM), dynamic random access memory (DRAM), or Flash). The storage 930 is generally included to be representative of a non-volatile memory, such as a hard disk drive, solid state device (SSD), removable memory cards, optical storage, or flash memory devices. In an alternative embodiment, the storage 930 can be replaced by storage area-network (SAN) devices, the cloud, or other devices connected to the form compliance manager 900 via the I/O device interface 910 or a network 950 via the network interface 915.

In some embodiments, the memory 925 stores instructions 960 and the storage 930 stores updated form 932. However, in various embodiments, the instructions 960 and updated form 932 are stored partially in memory 925 and partially in storage 930, or they are stored entirely in memory 925 or entirely in storage 930, or they are accessed over a network 950 via the network interface 915.

Instructions 960 can be processor-executable instructions for performing any portion of, or all of, any of the methods of FIGS. 2-5 and/or any of the functionality discussed in FIGS. 1, 6A-6B, 7A-7B, and/or 8A-8B.

Updated form 932 can be consistent with updated form 116 of FIG. 1 and can be configured to contain context cues useful for guiding a user through completion of a form.

In various embodiments, the I/O devices 912 include an interface capable of presenting information and receiving input. For example, I/O devices 912 can present information to a user interacting with form compliance manager 900 and receive input from the user.

Form compliance manager 900 is connected to the network 950 via the network interface 915. Network 950 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
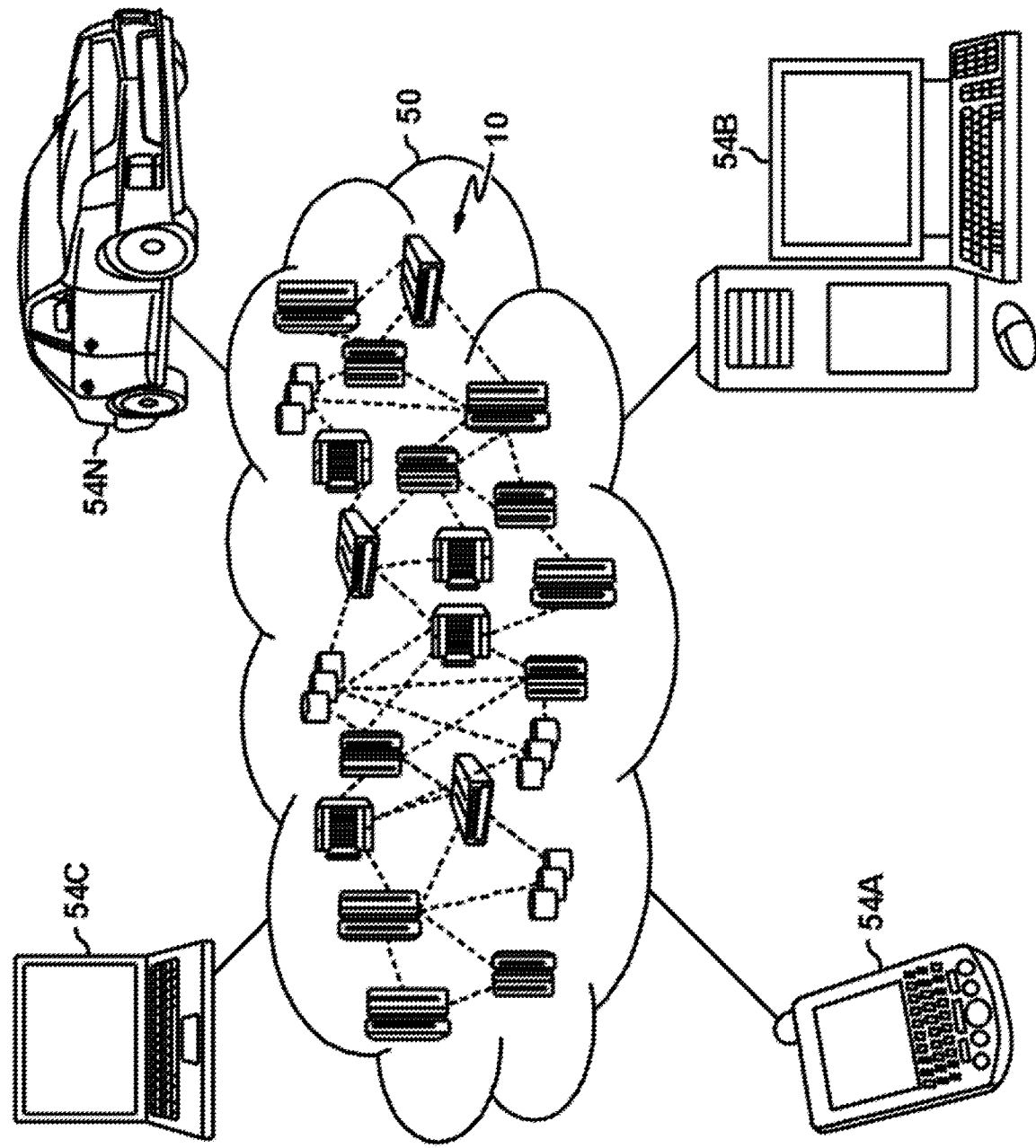
FIG. 10 depicts a cloud computing environment, according to some embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
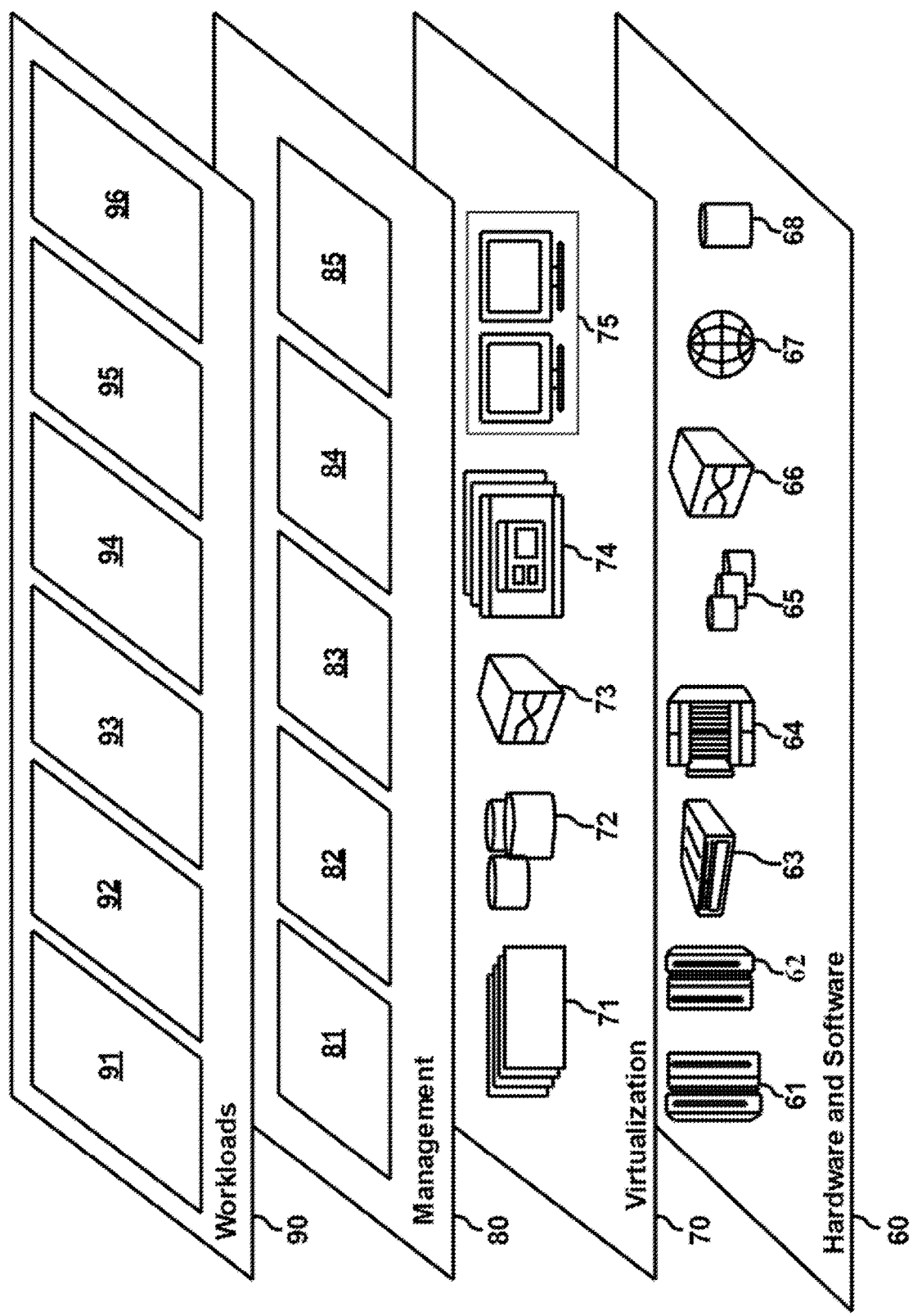
FIG. 11 depicts abstraction model layers, according to some embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and form compliance management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 960 of FIG. 9 and/or any software configured to perform any subset of the methods described with respect to FIGS. 2-5 and/or any of the functionality discussed in FIGS. 1, 6A-6B, 7A-7B, and/or 8A-8B) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   creating a policy graph corresponding to an electronic image of an offline form and a corresponding instruction set by:
   identifying a first field in the electronic image of the offline form using named entity recognition;
   identifying a statement from the corresponding instruction set related to the first field; and
   representing the statement in subject-verb-object (SVO) format in a subgraph of the policy graph related to the first field;
   generating an electronically fillable form corresponding to the offline form and including a first context cue for the first field in the electronically fillable form, wherein the first context cue is based on the subgraph, and wherein the subgraph includes field completion information for the first field, field value information for the first field, and field format information for the first field;
   presenting the first context cue on the electronically fillable form in response to selection of the first field; and
   verifying correctness of a completed form using the policy graph and a rules engine executing a Rete algorithm that compares tuples of data from the policy graph with corresponding tuples of data from the completed form, and wherein the tuples of data include, for respective fields, a completion indicator, a content format indicator, and a content value indicator.

2. The method of claim 1,
   wherein a name of the first field is the subject, and wherein the verb and the object are based on the statement.

3. The method according to claim 2, wherein the first context cue is based on the subject-verb-object format.

4. The method of claim 2, wherein creating the policy graph further comprises:
   disambiguating respective field names.

5. The method according to claim 1, wherein creating the policy graph further comprises:
   determining field completion information from the electronic image of the offline form and the corresponding instruction set.

6. The method according to claim 5, wherein determining field completion information includes determining field dependencies.

7. The method of claim 6, wherein determining field completion information includes determining a classification selected from a group consisting of: mandatory, optional, conditionally mandatory, and conditionally optional.

8. The method of claim 7, wherein the classification of the first field is a conditionally mandatory field, and wherein input to the first field is mandatory in response to an input to another field.

9. The method according to claim 1, wherein creating the policy graph further comprises:
   determining field value information from the electronic image of the offline form and the corresponding instruction set.

10. The method of claim 9, wherein determining field value information includes determining at least one selected from a group consisting of: a minimum value, and a maximum value.

11. The method according to claim 1, wherein creating the policy graph further comprises:
    determining field format information from the electronic image of the offline form and the corresponding instruction set.

12. The method of claim 11, wherein determining field format information includes a number of characters, a type of characters, and an arrangement of characters.

13. The method of claim 1, wherein generating the electronically fillable form further comprises:

retrieving the subgraph of the policy graph related to the first field; and generating the first context cue based on the subgraph.

14. A computer program product comprising program instructions stored on a computer readable storage medium, wherein the computer readable storage medium is not a transitory signal per se, the program instructions executable by a processor to cause the processor to perform a method comprising:

creating a policy graph corresponding to an electronic image of an offline form and a corresponding instruction set by:

identifying a first field in the electronic image of the offline form using named entity recognition;

identifying a statement from the corresponding instruction set related to the first field; and representing the statement in subject-verb-object (SVO) format in a subgraph of the policy graph related to the first field;

generating an electronically fillable form corresponding to the offline form and including a first context cue for the first field in the electronically fillable form, wherein the first context cue is based on the subgraph, and wherein the subgraph includes field completion information for the first field, field value information for the first field, and field format information for the first field;

presenting the first context cue on the electronically fillable form in response to selection of the first field; and verifying correctness of a completed form using the policy graph and a rules engine executing a Rete algorithm that compares tuples of data from the policy graph with corresponding tuples of data from the completed form, and wherein the tuples of data include, for respective fields, a completion indicator, a content format indicator, and a content value indicator.

15. The computer program product of claim 14, wherein the program instructions were downloaded over a network from a remote server, and wherein the method further comprises:

metering usage of the program instructions; and generating an invoice based on metering the usage.

16. The computer program product of claim 14, wherein the computer readable storage medium storing the program instructions is a server data processing system, and wherein the program instructions are downloaded over a network to a remote data processing system for use in a remote computer readable storage medium with the remote data processing system, and wherein the method further comprises:

metering usage of the program instructions; and generating an invoice based on metering the usage.

17. A system comprising:

a computer-readable storage medium storing program instructions, wherein the computer readable storage medium is not a transitory signal per se; and a processor configured to execute the program instructions to perform a method comprising:

creating a policy graph corresponding to an electronic image of an offline form and a corresponding instruction set by:

identifying a first field in the electronic image of the offline form using named entity recognition;

identifying a statement from the corresponding instruction set related to the first field; and representing the statement in subject-verb-object (SVO) format in a subgraph of the policy graph related to the first field;

generating an electronically fillable form corresponding to the offline form and including a first context cue for the first field in the electronically fillable form, wherein the first context cue is based on the subgraph, and wherein the subgraph includes field completion information for the first field, field value information for the first field, and field format information for the first field;

presenting the first context cue on the electronically fillable form in response to selection of the first field; and verifying correctness of a completed form using the policy graph and a rules engine executing a Rete algorithm that compares tuples of data from the policy graph with corresponding tuples of data from the completed form, and wherein the tuples of data include, for respective fields, a completion indicator, a content format indicator, and a content value indicator.

* * * * *